(12) United States Patent
Steiner et al.

(10) Patent No.: US 8,116,237 B2
(45) Date of Patent: *Feb. 14, 2012

(54) CLEARING HOUSE FOR PUBLISH/SUBSCRIBE OF STATUS DATA FROM DISTRIBUTED TELECOMMUNICATIONS SYSTEMS

(75) Inventors: Robert Steiner, Broomfield, CO (US); Derek Flockhart, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 103 days.

This patent is subject to a terminal disclaimer.

(21) Appl. No.: 12/239,120

(22) Filed: Sep. 26, 2008

(65) Prior Publication Data

US 2010/0080150 A1    Apr. 1, 2010

(51) Int. Cl.
*H04L 12/16* (2006.01)
*H04Q 11/00* (2006.01)

(52) U.S. Cl. ......... 370/260; 370/261; 370/262; 370/270

(58) Field of Classification Search .................. 370/260, 370/262, 270
See application file for complete search history.

(56) References Cited

U.S. PATENT DOCUMENTS

| | | |
|---|---|---|
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,329,579 A | 7/1994 | Brunson |
| 5,335,268 A | 8/1994 | Kelly, Jr. et al. |
| 5,335,269 A | 8/1994 | Steinlicht |
| 5,390,243 A | 2/1995 | Casselman et al. |

(Continued)

FOREIGN PATENT DOCUMENTS

CA    2143198    1/1995

(Continued)

OTHER PUBLICATIONS

U.S. Appl. No. 12/545,386, filed Aug. 21, 2009, Flockhart et al.
U.S. Appl. No. 12/469,523, filed May 20, 2009, Steiner.
U.S. Appl. No. 11/619,504, filed Jan. 3, 2007, Davis et al.
U.S. Appl. No. 12/564,831, filed Sep. 21, 2009 Flockhart et al.
U.S. Appl. No. 10/815,534, filed Mar. 31, 2004, Kiefhaber.
U.S. Appl. No. 10/815,566, filed Mar. 31, 2004, Kiefhaber.
U.S. Appl. No. 10/815,584, filed Mar. 31, 2004, Kiefhaber.
U.S. Appl. No. 10/861,193, filed Jun. 3, 2004, Kiefhaber.

(Continued)

*Primary Examiner* — Chi Pham
*Assistant Examiner* — Farah Faroul
(74) *Attorney, Agent, or Firm* — Sheridan Ross P.C.

(57) ABSTRACT

A distributed contact center and method of managing data transfers between the distributed parts of the contact center is provided. Distributed parts of the contact center are joined together through a known communications initiation protocol, then one or both of status information and control signals are transferred between the distributed parts using lossless communication protocols. The status information and/or control signals may be published to a large number of interested entities through the use of conference call facilities.

18 Claims, 3 Drawing Sheets

U.S. PATENT DOCUMENTS

| | | |
|---|---|---|
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,940,498 A | 8/1999 | Bardl |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,697,457 B2 | 2/2004 | Petrushin |
| 6,704,409 B1 | 3/2004 | Dilip et al. |
| 6,707,903 B2 | 3/2004 | Qutub et al. |
| 6,744,877 B1 | 6/2004 | Edwards |
| 6,754,333 B1 | 6/2004 | Flockhart et al. |
| 6,766,013 B2 | 7/2004 | Flockhart et al. |
| 6,766,014 B2 | 7/2004 | Flockhart et al. |
| 6,785,380 B2 | 8/2004 | Ribera |
| 6,947,543 B2 | 9/2005 | Alvarado et al. |
| 7,035,808 B1 | 4/2006 | Ford |
| 7,035,927 B2 | 4/2006 | Flockhart et al. |
| 7,200,219 B1 | 4/2007 | Edwards et al. |
| 7,295,669 B1 | 11/2007 | Denton |
| 7,417,989 B1* | 8/2008 | Doran .................... 370/390 |
| 7,444,139 B1* | 10/2008 | Welch et al. .............. 455/416 |

| | | |
|---|---|---|
| 7,500,241 B1 | 3/2009 | Flockhart et al. |
| 7,574,736 B2 | 8/2009 | Salapaka et al. |
| 2002/0178273 A1 | 11/2002 | Pardo-Castellote et al. |
| 2002/0194002 A1 | 12/2002 | Petrushin |
| 2003/0093465 A1 | 5/2003 | Banerjee et al. |
| 2003/0120789 A1 | 6/2003 | Hepworth et al. |
| 2003/0174830 A1 | 9/2003 | Boyer et al. |
| 2003/0177017 A1 | 9/2003 | Boyer et al. |
| 2004/0003046 A1* | 1/2004 | Grabelsky et al. ............ 709/206 |
| 2004/0203878 A1 | 10/2004 | Thomson |
| 2005/0068907 A1* | 3/2005 | Garg et al. ................... 370/270 |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2006/0015388 A1 | 1/2006 | Flockhart et al. |
| 2006/0067506 A1 | 3/2006 | Flockhart et al. |
| 2006/0098625 A1* | 5/2006 | King et al. ................... 370/352 |
| 2006/0126816 A1* | 6/2006 | Shaffer et al. ............ 379/265.02 |
| 2006/0173921 A1 | 8/2006 | Jalonen |
| 2006/0221941 A1* | 10/2006 | Kishinsky et al. ............ 370/352 |
| 2006/0245391 A1* | 11/2006 | Vaidya et al. ................. 370/329 |
| 2007/0072618 A1* | 3/2007 | Freytsis et al. ............. 455/452.2 |
| 2007/0140465 A1* | 6/2007 | Erhart et al. ................... 379/235 |
| 2007/0263787 A1 | 11/2007 | Dong et al. |
| 2007/0276937 A1* | 11/2007 | Chavda et al. ................ 709/224 |
| 2007/0299680 A1 | 12/2007 | Fama et al. |
| 2008/0084831 A1* | 4/2008 | Sylvain ........................ 370/260 |
| 2009/0003549 A1* | 1/2009 | Baird et al. ................. 379/88.18 |
| 2009/0238359 A1* | 9/2009 | Ely et al. .................. 379/265.02 |
| 2009/0279436 A1* | 11/2009 | Chin et al. .................... 370/237 |

FOREIGN PATENT DOCUMENTS

| | | |
|---|---|---|
| CA | 2174762 | 3/1996 |
| DE | 102006031080 | 1/2008 |
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| EP | 1643743 | 4/2006 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

U.S. Appl. No. 10/946,638, filed Sep. 20, 2004, Flockhart et al.
"Applications, NPRI's Predictive Dialing Package," Computer Technology (Fall 1993), p. 86.
"Domain Name Services," available at http://www.psm.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, CRC Information Systems, Inc., Tel-Athena, Sectional 5-Company C520, p. 95, 1992.
"The Advantages of Load Balancing in the Multi-Call Center Enterprise," Avaya Inc. White Paper (Feb. 2002), pp. 1-13.
"The Dynamic Data Center", The Burton Group, Jun. 11, 2008, pp. 1-30.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
"Call Center Software You Can't Outgrow," Telemarketing® (Jul. 1993), p. 105.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc., "Better Implementation of IP in Large Networks," Avaya, Inc. 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.belisouth.neU NASApp/DNSWebUI/FAQ.jsp, downloaded Mar. 31,2003,4 pages.
CentreVu Advocate Release 9 User Guide, Avaya Inc., 585-215-953, Issue 1 (Dec. 2000), pp. 1-210.
Chavez, David, et al., "Avaya MultiVantage Software: Adapting Proven Call Processing for the Transition to Converged IP Networks," Avaya, Inc., Aug. 2002, pp. 1-20.
Coles, Scott, "A Guide for Ensuring Service Quality in IP Voice Networks," Avaya, Inc., 2002, pp. 1-17.
Dawson, "NPRI's Powerguide, Software Overview" Call Center Magazine (Jun. 1993), p. 85.
Definity Communications System Generic 3 Call Vectoring/Expert Agent Selection (EAS) Guide, AT&T publication No. 555-230-520 (Issue 4, Sep. 1995).
Doo-Hyun Kim et al. "Collaborative Multimedia Middleware Architecture and Advanced Internet Call Center," Proceedings at the International Conference on Information Networking (Jan. 31, 2001), pp. 246-250.
Douglas W. Stevenson et al., "Name Resolution in network and Systems Management Environments," available at http://netman.cit.buffalo.edu/Doc/Dstevenson/NR-NMSE.html, downloaded Mar. 31, 2003, 16 pages.
Foster, Robin, et al., "Avaya Business Advocate and its Relationship to Multi-Site Load Balancing Applications," Avaya, Inc., Mar. 2002, 14 pages.
GEOTEL Communications Corporation Web site printout entitled "Intelligent CallRouter" Optimizing the Interaction Between Customers and Answering Resources., 1998, 6 pages.
Hill, "Contact Center on Demand: An opportunity for telcos to be leaders in the grid-computing revolution," Telephony Online, Jul. 2, 2003, pp. 1-5.
John H.L. Hansen and Levent M. Arsian, Foreign Accent Classification Using Source Generator Based Prosodic Features, IEEE Proc. ICASSP, vol. 1, pp. 1-4, Detroit USA (May 1995).
L.F. Lamel and J.L. Gauvain, Language Identification Using Phone-Based Acoustic Likelihood, ICASSP-94, 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-32.
Levent M. Arsian, Foreign Accent Classification in American English, Department of Electrical Computer Engineering, Duke University, Thesis, pp. 1-218 (1996).
MIT Project Oxygen, Pervasis, Human-Centered Computing (MIT Laboratory for Computer Science) (Jun. 2000) pp. 1-15.
Presentation by Victor Zue, The MIT Ox90ygen Project, MIT Laboratory for Computer Science (Apr. 25-26, 2000) 9 pages.
Official Action for German Patent Application No. DE 102008062982.0-31, dated Jul. 3, 2009.
Search Report for Patent Application No. GB0823696.0, dated Apr. 7, 2009.
Official Action for U.S. Appl. No. 11/619,504, mailed Oct. 26, 2010.
Official Action for U.S. Appl. No. 11/619,504, mailed Mar. 31, 2011.

* cited by examiner

CLEARING HOUSE FOR PUBLISH/SUBSCRIBE OF STATUS DATA FROM DISTRIBUTED TELECOMMUNICATIONS SYSTEMS

FIELD

The present invention is directed generally to distributed contact centers and more specifically to the transfer of status information and control signals between different sites in a distributed contact center.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (Le., programmable by the operator of the contact center), via a capability called vectoring. Normally, in a present-day Automatic Call Distributor (ACD) when the ACD system's controller detects that an agent has become available to handle a contact, the controller identifies all predefined contact-handling queues for the agent (usually in some order of priority) and delivers to the available agent the highest-priority oldest contact that matches the agent's highest-priority queue.

Originally, contact centers were designed as single site operations. In other words, all of the contact center resources such as servers, agents, managers, and the like were located at a single site. A single site contact center was relatively easy to manage because all of the resources were essentially in a common environment. When an agent became available, the server controlling workflow was apprised of the availability almost instantly and could monitor the contact and agent queues in real-time.

As businesses become global and contact center job outsourcing becomes a viable option to many companies, contact centers are beginning to grow into multiple site operations. The resources for a contact center may be redundantly provided at each site such that every site can operate autonomously and communication between sites is not a requirement for operation. However, providing fully redundant contact center sites can become costly when the only additional resource really required is contact center agents. For this reason, many multiple site contact centers share resources. For example, one site may have all of the resources to be a complete contact center, whereas another site only has contact center agents or other resources with specific skills. The complete contact center receives all incoming contacts and routes the contacts to the other site having only agents or specialized resources. Under this scenario, contact center agent status information has to be relayed from the remote site to the ACD at the complete contact center. In fact, it is often the case in multiple site call centers that large amounts of information about the agents, skills (services), queues, and other status information needs to be transmitted between sites. An example of such a geographically distributed call center is described in US Patent Application No. 20060067506 to Flockhart et al., the entire disclosure of which is hereby incorporated herein by reference.

Functions that are performed as part of network management and in managing contact centers specifically include controlling, planning, allocating, deploying, distributing, coordinating, and monitoring the resources of a network. Network planning, traffic routing, load balancing, resource optimization, cryptographic key and/or license distribution, configuration management, fault management, and many other functions are examples of such data. A number of methods exist to support such network management function including, but not limited to, Simple Network Management Protocol (SNMP), Command Line Interfaces (CLIs), eXtensible Mark-up Language (XML) variants, Comm on Management Information Protocol (CMIP), and others.

Specifically, in fully distributed architectures such as Services Oriented Architectures (SOAs), contact centers and other large distributed telecommunications environments, such a method of data distribution would be particularly useful. Illustratively, in contact centers, large amounts of information about agents, skills (services), and queues need to be transmitted between the distributed contact center locations. The communications link should be established to the other sites by first finding them, then by making a connection (usually through firewalls), and finally providing real-time, encrypted communications with some guarantee of minimum latency.

SUMMARY

Mechanisms have been developed to facilitate the efficient transmission of status and control information between geographically disparate call centers using codec tunneling. U.S. patent application Ser. No. 11/619,504 to Davis et al., the entire contents of which are incorporated herein by reference, describes how to utilize Session Initiation Protocol (SIP) and a Real-time Transport Protocol (RTP) to communicate data between separate communication elements. This particular patent application proposed to use the capabilities of SIP to find and connect two endpoints and establish an RTP session between the endpoints. To find additional sites, a SIP INVITE message is used to establish a new session with additional remote servers, thereby making the expansion of the system somewhat inefficient.

Embodiments of the present invention propose the use of conference call facilities to allow interested parties (e.g., distributed locations in the case of a contact center) to dial into or connect with a secure conference call and then publish and subscribe to data which is published by other participants of the conference call. Therefore, use of conference call facilities provides an efficient mechanism for expanding the number of parties that share status and control information.

In the context of a contact center, the concept of using a secure conference call for data communications amongst the distributed contact center locations provides the advantage of creating a clearing house that any distributed application can participate in when they are in an active contact center location or in the case of SOA when they are a required application.

In accordance with at least some embodiments of the present invention, a method of sharing status and/or control information is provided that generally comprises:

subscribing, at a first communication site, with a conference mechanism;

establishing, by the first communication site, a Real-time Transport Protocol (RTP) stream with the conference mechanism; and receiving, at the first communication site, at least one of status information and control signals associated with a second communication site from the conference mechanism via the RTP stream.

Another method is provided that generally comprises:

subscribing, at a first communication site, with a conference mechanism;

establishing, by the first communication site, a Real-time Transport Protocol (RTP) stream with the conference mechanism; and providing, by the first communication site, at least one of status information and control signals to the conference mechanism for publishing to a second communication site via a separate RTP stream.

As can be appreciated by one skilled in the art, a single communication endpoint and/or site may be adapted to publish and subscribe to published information. The conference mechanism is a mechanism that facilitates the sharing of this published information among other subscribing entities (e.g., other communication endpoints and/or sites).

An RTP packet and header structure as well as the Real-time Transport Control Protocol (RTCP) is described more fully in US Patent Application No. 20030120789 to Hepworth et al., the entire disclosure of which is hereby incorporated by reference. Although embodiments of the invention are described in connection with the use of RTP, it can be appreciated by one of skill in the art that a similar media transport protocol may be employed. Accordingly, as used herein "RTP" is understood to include any standardized or non-standardized packet format for delivering audio and/or video information over a packet switched network. Allowable protocols may include any multicast and/or unicast protocols used in streaming media systems. The protocols may be designed for real-time applications like RTP or they may be designed for non-real-time application. Moreover, RTP as discussed herein can include any past, present, or future version of RTP including Secure RTP (SRTP) and those versions and derivatives of RTP not yet contemplated.

As can be appreciated by one of skill in the art, a contact is understood herein to include voice calls, emails, chat, video calls, fax, Instant Messages (IMs), conferences, and combinations thereof. Accordingly, a contact center may be equipped to handle any one or a number of the above-noted contact types.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any computing application in which it is desirable to share status/control information.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
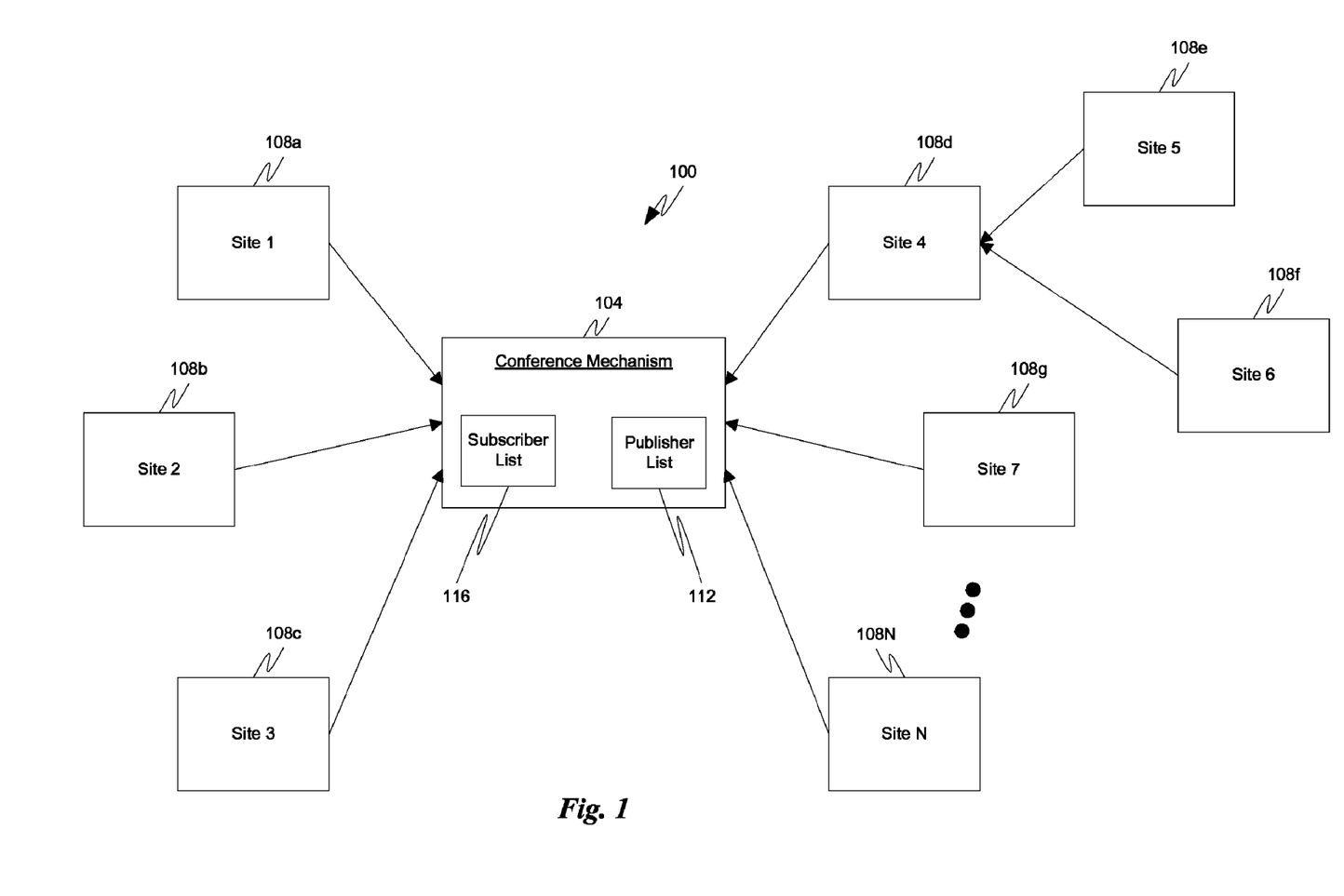
FIG. 1 is a block diagram depicting a distributed communication system in accordance with embodiments of the present invention.

FIG. 1 shows an illustrative embodiment of a distributed communication system 100 in accordance with at least some embodiments of the present invention. The communication system 100 may comprise a plurality of communication endpoints or other types of distributed sites 108 connected to a common conference mechanism 104. The conference mechanism 104 may be adapted to act as an information clearing house for each of the sites 108a-N connected thereto. More specifically, the conference mechanism 104 may collect information that is published from various sites 108 and selectively share the published information with other sites 108 that have been given permissions to access the published information.

Permissions to access published information may be granted generically to any site 108 that is capable of connecting to the conference mechanism 104 (i.e., any site 108 that has connected to the appropriate conference number on the conference mechanism 104 and/or provided the conference mechanism 104 with a valid password). Alternatively, permissions to access published information may be granted selectively by the publishing site 108. For instance, the publishing site 108 may identify other sites 108 that are allowed to receive published information or the publishing site 108 may identify certain requirements that another site 108 has to meet before that site 108 is allowed access to information sent to the conference mechanism 104 by the publishing site 108. In accordance with at least some embodiments of the present invention, each site 108 may connect with the conference mechanism 104 at one of several different access permission levels (e.g., low, medium, or high access permission levels). A publishing site 108 may, for example, identify the minimum access permission level that is required for another site 108 to be eligible to receive information published by the publishing site 108.

In accordance with at least some embodiments of the present invention, the conference mechanism 104 may comprise one or more data structures to help determine how published information should be distributed among the sites 108 connected thereto. Examples of the types of data structures that may be maintained at the conference mechanism 104 include a publisher list 112 and a subscriber list 116. Although these lists are depicted as being separate lists, one skilled in the art will appreciate that a single publisher/subscriber list may be maintained on the conference mechanism 104. The lists 112, 116 may be dynamically updated as sites 108 connect to and disconnect from the conference mechanism 104.

As can be seen in FIG. 1, a plurality of sites 108a-d, 108g-108N may be connected directly to the conference mechanism 104. Additionally, one or more sites 108e, 108f may be connected to the conference mechanism 104 through another site 108. In accordance with at least some embodiments of the present invention, the multiple communication sites 108 may be connected to the conference mechanism 104 via a single communication port (e.g., an Ethernet port, a phone port, an RS-232 port, etc.). Alternatively, multiple sites 108 may be connected to the conference mechanism 104 via a plurality of different interfaces or ports. In the event that a single port is used to connect two or more sites 108 to the conference mechanism 104, multiple separate RTP sessions may still be established with each communication site 108.

In accordance with at least some embodiments of the present invention, the sites 108 may correspond to a single communication endpoint (e.g., a phone, laptop, computer, etc.), a collection of communication endpoints, a single communication device (e.g., a switch, a server, a gateway, or some other intermediate communication device), and/or a collection of communication devices. A contact center is one example of a site 108 that may be connected to the conference mechanism 104 in accordance with at least some embodiments of the present invention. The contact center may be adapted to share and receive status and/or control information from other contact centers and a contact center controller or call router via the conference mechanism 104.

Figure 2A:
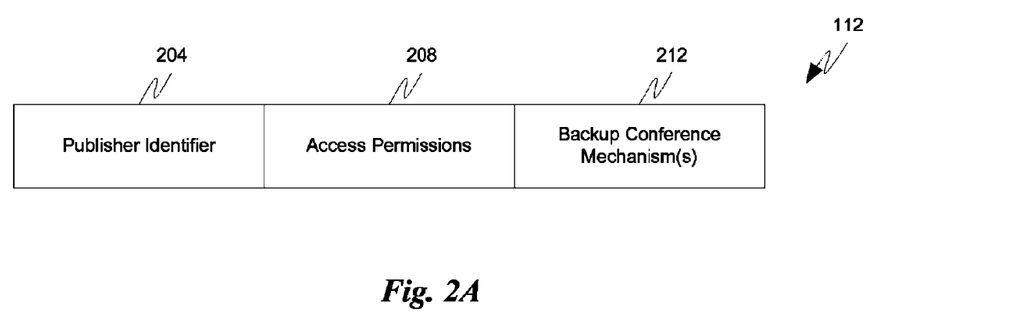
FIG. 2A is a block diagram depicting a publish data structure utilized in accordance with embodiments of the present invention.
Figure 2B:
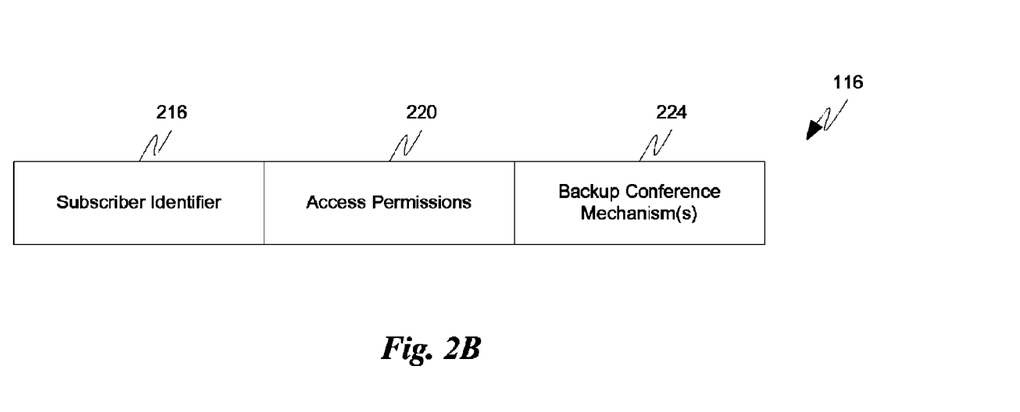
FIG. 2B is a block diagram depicting a subscribe data structure utilized in accordance with embodiments of the present invention.

Referring now to FIGS. 2A and 2B exemplary data structures 112, 116 utilized by the conference mechanism 104 will be described in accordance with at least some embodiments of the present invention. FIG. 2A depicts an exemplary publisher list 112 that is utilized to maintain identities of current publishing endpoints connected to the conference mechanism 104.

The publisher list 112 may comprise a number of different data fields to facilitate the dissemination of information received from each publishing entity. Examples of such data fields include a publisher identification field 204, an access permissions field 208, and a backup conference mechanism(s) identifier field 212. The publisher identification field 204 may be utilized to maintain identification information for each publishing entity that has created a secure connection (i.e., an RTP connection or SRTP connection) for sharing status and/or control information with the conference mechanism 104. The types of identification information that may be maintained in the publisher identification filed 204 includes, but is not limited to, a network address associated with a publishing entity (e.g., an IP address, an extension, a phone number, etc.), a location identifier (e.g., an identifier of the physical location of the site 108, an area code, or the like), a session identifier, a port identifier, or any other unique or semi-unique identifier for a communication site 108.

The access permission field 208 may include information related to data access permissions granted by or otherwise associated with a publishing entity. In accordance with at least some embodiments of the present invention, a publishing entity may be adapted to define access permissions for the data that is published by the publishing entity to the conference mechanism 104. Data, access permissions may be restricted in either a negative or positive manner. In a negative restriction, the publishing entity may identify security permissions or other requirements that must be met for another site 108 to be allowed access to information published by the publishing entity. In a positive restriction, the publishing entity may positively identify one or more sites 108 that are not allowed to access information published by the publishing entity. Thus, the access permission field 208 may include either identifiers of requirements needed to gain access to published information or identifiers of sites 108 that are allowed or not allowed to gain access to published information.

The backup conference mechanism(s) identifier field 212 may include information that can be used by the conference mechanism 104 to initiate and direct a re-connection of a publishing entity to another conference mechanism 104. This may be particularly useful in the event that Quality of Service (QoS) falls below a predefined threshold for data transmissions to/from a conference mechanism 104. In accordance with at least some embodiments of the present invention, if the conference mechanism 104 cannot support any further publishing entities, then the conference mechanism 104 may forward a request to connect to another conference mechanism 104 such that the publishing entity may still be able to connect with the status/control information clearing house. Information maintained in the backup identifier field 212 may include identifiers of potential backup conference mechanisms 104, their associated capabilities, as well as thresholds (e.g., minimum QoS) that define when a site 108 should be transferred to a backup conference mechanism 104 identified in the field 212.

FIG. 2B depicts an exemplary subscriber list 116 that may include a subscriber identifier field 216, an access permissions field 220, and a backup conference mechanism(s) identifier field 224. The backup conference mechanism(s) identifier field 224 may be similar to the same field 212 in the publisher list 112.

Figure 3:
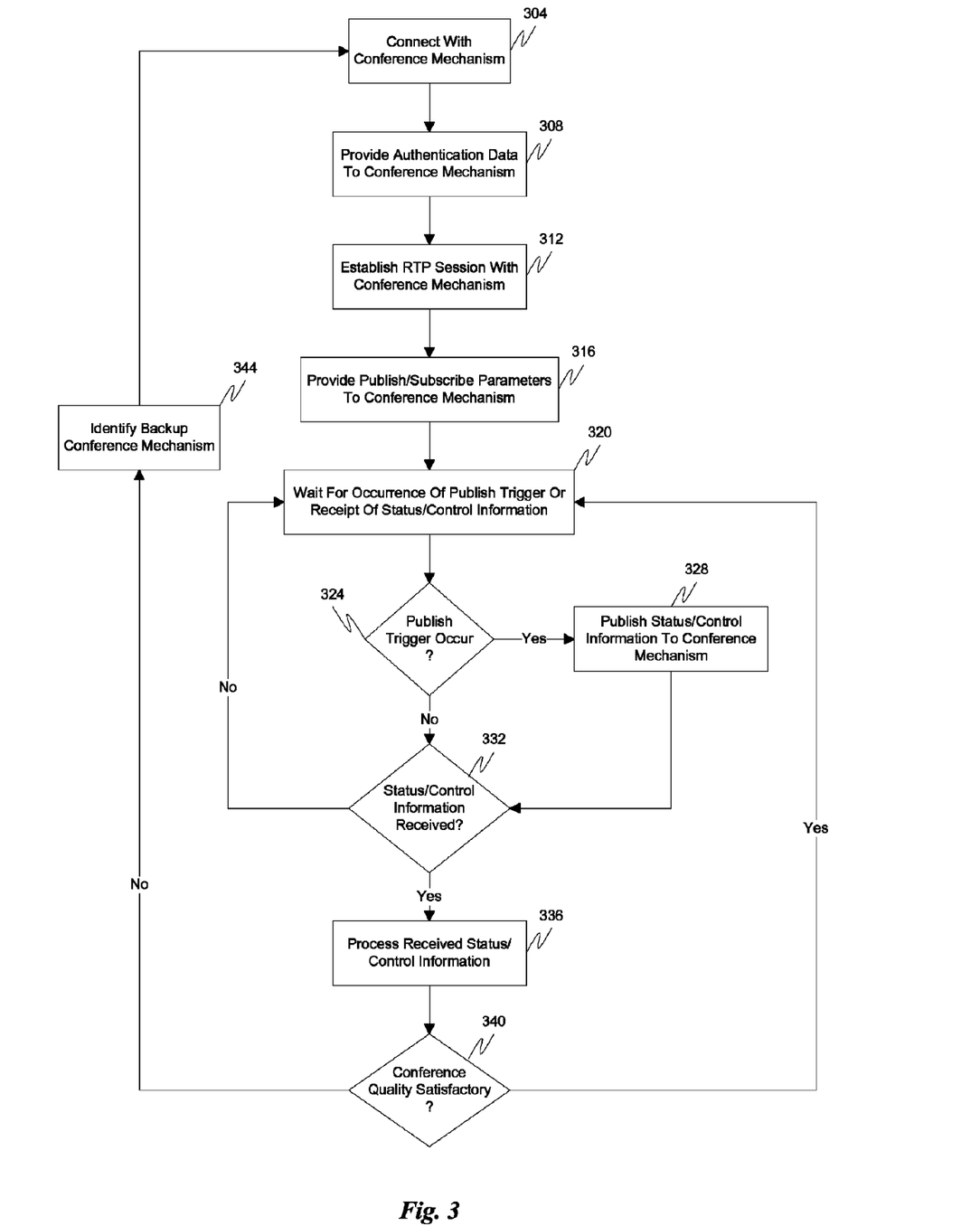
FIG. 3 is a flow diagram depicting a method of sharing status and/or control information in accordance with embodiments of the present invention.

Referring now to FIG. 3, an exemplary data sharing method will be described in accordance with at least some embodiments of the present invention. The method is initiated when a communication site 108 connects with a conference mechanism 104 (step 304). This particular step may involve the communication site 108 establishing a secure RTP stream with the conference mechanism 104, a prerequisite of which is that the communication site 108 may need to provide authentication information to the conference mechanism 104 (step 308). The communication site 108 may also require some sort of authentication information from the conference mechanism 104 (i.e., mutual authentication). Once the authentication information has been validated, the RTP stream is established between the conference mechanism 104 and the communication site 108 (step 312). The RTP stream may be employed to transfer status and/or control information between the conference mechanism 104 and the communication site 108. Additionally, the conference mechanism 104 may update its publishing list 112 and/or subscriber list 116, depending upon whether the communication site 108 is acting as a publishing and/or subscribing entity.

After the connection between the communication elements has been established, the method continues with the communication site 108 providing the publish/subscribe parameters to the conference mechanism 104 (step 316). Examples of such parameters include, but are not limited to, the types of published information a particular site 108 wants to receive (i.e., control vs. status information) as well as publishing and subscription access permissions for allowing or gaining access to published information.

Thereafter, the method continues by waiting until a publish trigger occurs or until published information is received due to the site's 108 subscription to the conference mechanism 104 (step 320). Thus, the communication site 108 first determines whether a publish trigger has occurred (step 324). A publish trigger may include meeting or exceeding any threshold associated with making a decision to publish status and/or control information. In accordance with at least one embodiment of the present invention, a publish trigger may include any state change at the communication site 108 (e.g., when the entire communication site 108 has a global state change). Another publish trigger may include any state change of sub-entities within the communication site 108. For instance, every time a resource (e.g., a contact center agent, IVR, voicemail, etc.) within the communication site 108 has a change in state, a publishing trigger may occur. Other publishing triggers may include the generation of a control signal. Still another publishing trigger may include receiving status information and/or control signals from another communication site 108. This is particularly relevant to instances where once communication site 108 is in communication with a conference mechanism 104 via another communication site 108.

In the event that a publishing trigger occurs, the method continues with the communication site 108 publishing the relevant status information and/or control signals to the conference mechanism 104 (step 328). If, however, a publishing event has not occurred, then the method continues by determining whether status information and/or control signals have been received at the conference mechanism 104 (step 332). This information may be received by a communication site 108 either connected directly to the conference mechanism 104 via an RTP stream or connected indirectly to the conference mechanism 104 though another communication site 108. If not data has been received at the conference mechanism 104 from a publishing communication site 108, then the method returns to step 320.

Alternatively, if some sort of status information and/or control signals are received at the conference mechanism 104, then the method continues with the conference mechanism 104 processing the received information and/or signals (step 336). In processing the receiving data, the conference mechanism 104 may utilize its publisher list 112 to determine if the received data has any access restrictions placed thereon as well as its subscriber list 116 to determine where the data can be sent. Depending upon this determination, the conference mechanism 104 may forward the received data to one or more subscribing entities allowed access to such data. Thus, the conference mechanism 104 operates as a conference bridge for status information and/or control signals for the communication sites 108 connected thereto. But rather than being a typical conference bridge, the conference mechanism 104 utilizes its various RTP streams with each communication site 108 to distribute such data. Moreover, the received data may include an identifier (e.g., that identifies the publishing entity) to help the conference mechanism 104 properly process the received data.

After the conference mechanism 104 has processed such data, the method continues by determining whether the conference quality is satisfactory with one or more of its RTP streams (step 340). This step may include performing a quality check on its connections with the communication sites 108. This step may also include polling the subscriber communication sites 108 to determine if published information sent to such entities was, in fact, received by those subscribing entities.

If the quality is satisfactory, then the method returns back to step 320. Conversely, if the quality of communications with one or more communication sites 108 is not up to quality thresholds, then the method continues with the conference mechanism 104 identifying a backup conference mechanism for one or more of the sites 108 connected thereto (step 344). This information may be retrieved from one or both lists 112, 116, depending upon whether the poor conference quality is associated with a publishing and/or subscribing entity. Thereafter, the method returns to step 304 where the communication site 108 attempts to connect with an alternative conference mechanism 104.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for sharing status and/or control information among a number of different entities. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A communication method, comprising:
subscribing, at a first contact center, with a conference mechanism, wherein the first contact center is a collection of communication devices;
establishing, by the first contact center, a first Real-time Transport Protocol (RTP) stream with the conference mechanism;
determining, by the first contact center, that a publication trigger has occurred, wherein the publication trigger includes a state change of a sub-entity within the first contact center;
providing, by the first contact center, at least one of status information and control signals associated with the first contact center to the conference mechanism via the first RTP stream;
providing, by the conference mechanism, the at least one of status information and control signals received from the first contact center to a second contact center via a second RTP stream; and
receiving, at the first contact center, at least one of status information and control signals associated with the second contact center from the conference mechanism via the first RTP stream, wherein the second contact center provides the at least one of status information and control signals associated with the second contact center to the conference mechanism via the second RTP stream established between the second contact center and conference mechanism.

2. The method of claim 1, further comprising receiving, at the first contact center, at least one of status information and control signals associated with a third contact center from the conference mechanism via the first RTP stream, wherein the third contact center provides the at least one of status information and control signals associated with the third contact center to the conference mechanism via a third RTP stream established between the third contact center and conference mechanism.

3. The method of claim 2, wherein the second and third contact centers are different contact centers each of which are individually subscribed with the conference mechanism.

4. The method of claim 1, wherein the at least one of status information and control signals associated with the second contact center and received at the conference mechanism comprise an identifier indicating the association of the at least one of status information and control signals with the second contact center that published the at least one of status information and control signals.

5. The method of claim 1, further comprising providing, by the first contact center, authentication information to the conference mechanism as a pre-requisite to establishing the first RTP stream.

6. A non-transitory computer readable medium comprising processor executable instructions that, when executed, perform the steps of claim 1.

7. A communication device, comprising:
a first interface used for communications with a first contact center site, wherein a first Real-time Transport Protocol (RTP) stream is established with the first contact center site via the first interface, wherein the first contact center site is associated with two or more communication devices;
a conference mechanism in communication with the first interface;
the first contact center site in communication with the first interface and the conference mechanism, wherein the first contact center site is configured to:
determine, by the first contact center site, that a publication trigger has occurred, wherein the publication trigger includes a state change of a sub-entity within the first contact center site;
provide, by the first contact center site, at least one of status information and control signals associated with the first contact center site to the conference mechanism via the first interface;
provide, by the conference mechanism, that at least one of status information and control signals received from the first contact center site to the second contact center site via a second interface; and
the second interface used for communications with the second contact center site, wherein a second RTP stream is established with the second contact center site via the second interface, wherein at least one of status information and control signals received at the second interface from the second contact center site are provided to the first contact center site via the first interface.

8. The communication device of claim 7, further comprising a third interface used for communications with a third contact center site, wherein a third RTP stream is established with the third contact center site via the third interface, and wherein at least one of status information and control signals received at the second interface are published to the third contact center site via the third interface.

9. The communication device of claim 7, further comprising at least one of a publisher list and subscriber list, wherein access permissions defined within at least one of the publisher list and subscriber list define that the first contact center site is allowed access to the at least one of status information and control data published by the second contact center site.

10. The communication device of claim 7, wherein the first RTP stream established via the first interface is different from the second RTP stream established via the second interface.

11. The communication device of claim 7, wherein the first and second interfaces comprise a common communication port.

12. The communication device of claim 7, wherein the at least one of status information and control signals associated with the second contact center site comprise an identifier indicating the association of the at least one of status information and control signals with a contact center site that published the at least one of status information and control signals.

13. The communication device of claim 7, wherein at least one of status information and control signals received at the first interface from the first contact center site are provided to the second contact center site via the second interface.

14. The communication device of claim 7, wherein both the first and second contact center sites comprise a plurality of contact center resources.

15. A method, comprising:
- subscribing, at a first contact center site, with a conference mechanism, the first contact center site comprising a plurality of contact center resources, wherein the contact center resources comprise two or more communication endpoints;
- establishing, by the first contact center site, a first Real-time Transport Protocol (RTP) stream with the conference mechanism;
- determining, by the first contact center site, that a publication trigger has occurred, wherein the publication trigger includes a state change of a sub-entity within the first contact center site;
- providing, by the first contact center site, at least one of status information and control signals associated with the first contact center site to the conference mechanism via the first RTP stream;
- providing, by the conference mechanism, that at least one of status information and control signals received from the first contact center site to a second contact center site via a second RTP stream; and
- receiving, at the first contact center site, at least one of status information and control signals associated with the second contact center site from the conference mechanism via the first RTP stream.

16. The method of claim 15, further comprising receiving, at the first contact center site and via the first RTP stream, control signals originated from the second communication site for controlling at least a part of the first contact center site.

17. The method of claim 15, further comprising determining, by the first contact center site, that a publishing trigger has occurred prior to providing the at least one of status information and control signals to the conference mechanism, wherein the publishing trigger comprises the generation of a control signal.

18. The method of claim 15, further comprising providing, by the first contact center site, authentication information to the conference mechanism as a pre-requisite to establishing the first RTP stream, wherein authentication information comprises at least one of a conference number associated with the conference mechanism and a password.

* * * * *